(12) United States Patent
Reilley

(10) Patent No.: US 9,394,972 B1
(45) Date of Patent: Jul. 19, 2016

(54) AUTOMATIC TRANSMISSION WITH IMPROVED EFFICENCY

(71) Applicant: Peter Reilley, Londonderry, NH (US)

(72) Inventor: Peter Reilley, Londonderry, NH (US)

(*) Notice: Subject to any disclaimer, the term of this patent is extended or adjusted under 35 U.S.C. 154(b) by 0 days.

(21) Appl. No.: 13/872,319

(22) Filed: Apr. 29, 2013

(51) Int. Cl.
*F16H 3/08* (2006.01)

(52) U.S. Cl.
CPC ........................... *F16H 3/08* (2013.01)

(58) Field of Classification Search
USPC ............................................ 74/330, 331, 335
See application file for complete search history.

(56) References Cited

U.S. PATENT DOCUMENTS

| | | | |
|---|---|---|---|
| 2,386,540 A | 10/1945 | Campodonico | |
| 4,461,188 A | 7/1984 | Fisher | |
| 6,463,821 B1 | 10/2002 | Reed, Jr. | |
| 6,755,089 B2* | 6/2004 | Hirt | 74/329 |
| 7,263,907 B2* | 9/2007 | Stevenson | 74/340 |
| 7,448,290 B2* | 11/2008 | Gitt | 74/331 |
| 7,896,770 B2* | 3/2011 | Earhart et al. | 475/218 |
| 7,992,459 B2* | 8/2011 | Krieger et al. | 74/336 R |
| 8,206,265 B2* | 6/2012 | Maten et al. | 477/130 |
| 8,641,573 B2* | 2/2014 | Ideshio et al. | 475/218 |
| 8,870,712 B2* | 10/2014 | Steinborn et al. | 477/77 |
| 2004/0144190 A1* | 7/2004 | Hall, III | 74/331 |

* cited by examiner

*Primary Examiner* — Ha D Ho

(57) ABSTRACT

The automatic transmission with improved efficiency combines the advantages of existing standard transmissions with new features that allow fully automatic operation. The transmission uses two or more lay shafts and non-constant mesh gears to allow continuous power transfer even during shifting between gears. The non-constant mesh gears are synchronized during shifting through the use of servo motors and position sensors.

17 Claims, 2 Drawing Sheets

AUTOMATIC TRANSMISSION WITH IMPROVED EFFICENCY

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

Figure 1:
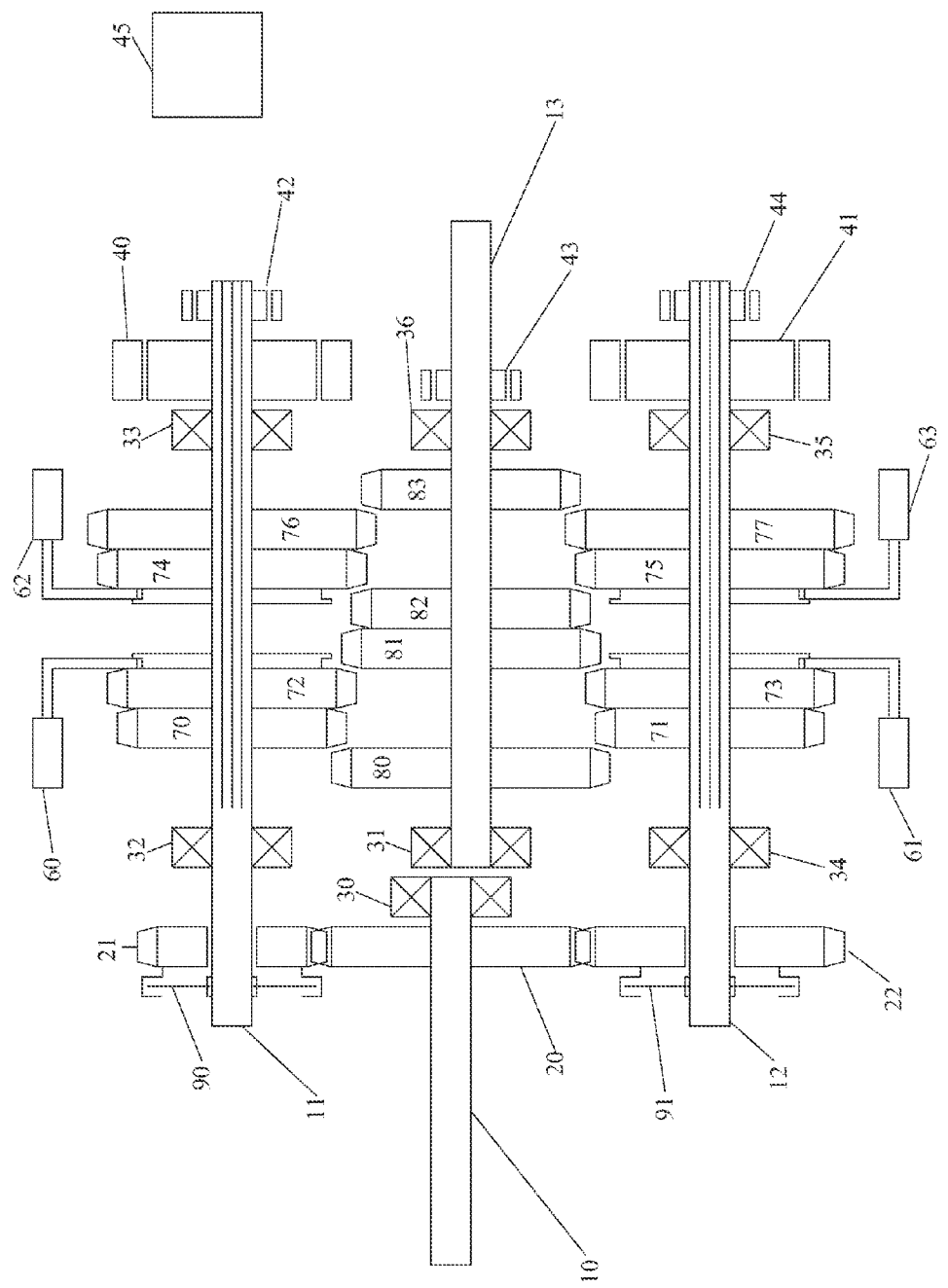

This invention relates to improving the efficiency of automatic transmissions used in motor vehicles.

2. Prior Art

There have been a number of inventions in the history of vehicle transmissions. Ford's famous Model A used a 3 speed manual transmission and a foot operated clutch. This transmission changed gear ratios by sliding different gears into engagement. There was no automatic method for insuring that the gears were turning at a matching speed as they were engaged. This required the driver to carefully synchronize the speed of the gears before shifting. Failure to do this well would result in grind the gears and a shorter transmission life. A driver had to learn a complicated process called double clutching. This entailed pressing the clutch pedal two times while at the same time changing engine speed to bring the gears into synchronization.

This was difficult for most people to master. The solution was a transmission with automatic synchronizers. This eliminated the need for double clutching. The synchronizers acted between the gears to eliminate any speed difference. Thus, the transmission could be shifted without worrying about grinding gears.

In a synchromesh transmission all gears were engaged at all times, a feature called constant mesh. The transmissions gear ratio is changed by using shifter rings that lock the desired gear to its shaft. This design combines two features; constant mesh gears and synchronizers. All modern standard transmission cars have synchromesh transmissions.

Unfortunately, in a constant mesh transmission all gears remain engaged and turning even when not carrying the load thereby causing drag and reducing energy efficiency. Furthermore, the synchronizer rings for those gears not engaged also cause drag wasting more power and additional reductions in efficiency.

But people did not want to worry about shifting at all. Thus was born the fully automatic transmission. This removed the chore of shifting the transmission completely. Gear changes were entirely managed by engaging clutches which were controlled by a computer.

Early designs had a hydraulic computer that controlled the clutches. More recently, the management of the transmission is left to an electronic computer. Automatic transmissions are also constant mesh gearboxes but are shifted by means of friction clutches. The transmission has series of clutches that allow a particular set of planetary gears to rotate or to be locked together.

In any particular gear some clutches would be engaged and others would be relaxed. The relaxed clutches also spin resulting in drag which reduces efficiency.

Each of these inventions solved some problems but exacerbated other problems. The Model A transmission was simple and very efficient. No gears were engaged unless they were being used to carry power. This reduced friction and wear. However, it was difficult to use and gears could be damaged by improper shifting.

The synchromesh transmission was much easier to use but had many moving parts all contributing to drag. All gears were engaged at all times with only some of the gears being used to carry power. The synchronizer clutches dragged for all the gears except the one currently selected.

The fully automatic transmission was even easier to use but had even more moving parts all contributing to wear and drag. In any particular gear, multiple clutches would not be engaged but were rotating thereby adding to drag.

PRIOR PATENT ART

The idea of a transmission with multiple lay shafts and multiple clutches is not new. U.S. Pat. No. 2,386,540 by John J. Campodonico describes a transmission with two lay shafts and two clutches. This patent describes a feature where the next gear ratio is selected before the transmission is actually shifted. The actual shifting is accomplished by releasing one clutch and then engaging the other clutch. This transmission incorporated constant mesh gears and grinding is avoided by using mechanical synchronizers.

U.S. Pat. No. 4,461,188 describes a dual lay shaft transmission configured for a transverse engine in a front wheel drive vehicle. It too uses two clutches to select between sets of gears. The constant mesh gears are synchronized using mechanical synchronizers.

U.S. Pat. No. 6,463,821 illustrates a method of using the dual clutches to control the shifting of the transmission. The engagement and release of the clutches is changed as the load on the transmission is changed.

PRIOR ART IN PRODUCTS

Chrysler motors introduced dual lay shaft and dual clutch transmissions in both automobile and truck versions. These are the 79REM and 62TEM transmissions. These transmissions are constant mesh designs that use mechanical synchronizers to prevent gear grinding during shifting.

OBJECTS AND ADVANTAGES

The present invention improves on previous designs in these ways;
1. Reduced drag from unnecessary moving parts.
2. Fewer parts.
3. More compact design.
4. Fully automatic shifting.
5. Only two clutches are necessary to shift all gears.
6. The clutches are separate from the gear mechanism allowing easy maintenance.

SUMMARY

The automatic transmission with improved efficiency combines the best features of early transmission designs with an innovative synchronizing mechanism. This provides a simpler and more compact automatic transmission. The compact structure supports a design with many possible gear ratios. The external clutch feature allows easier maintenance.

DRAWINGS

FIG. 1 This shows the arrangement of the gears, clutches and motors.

Figure 2:
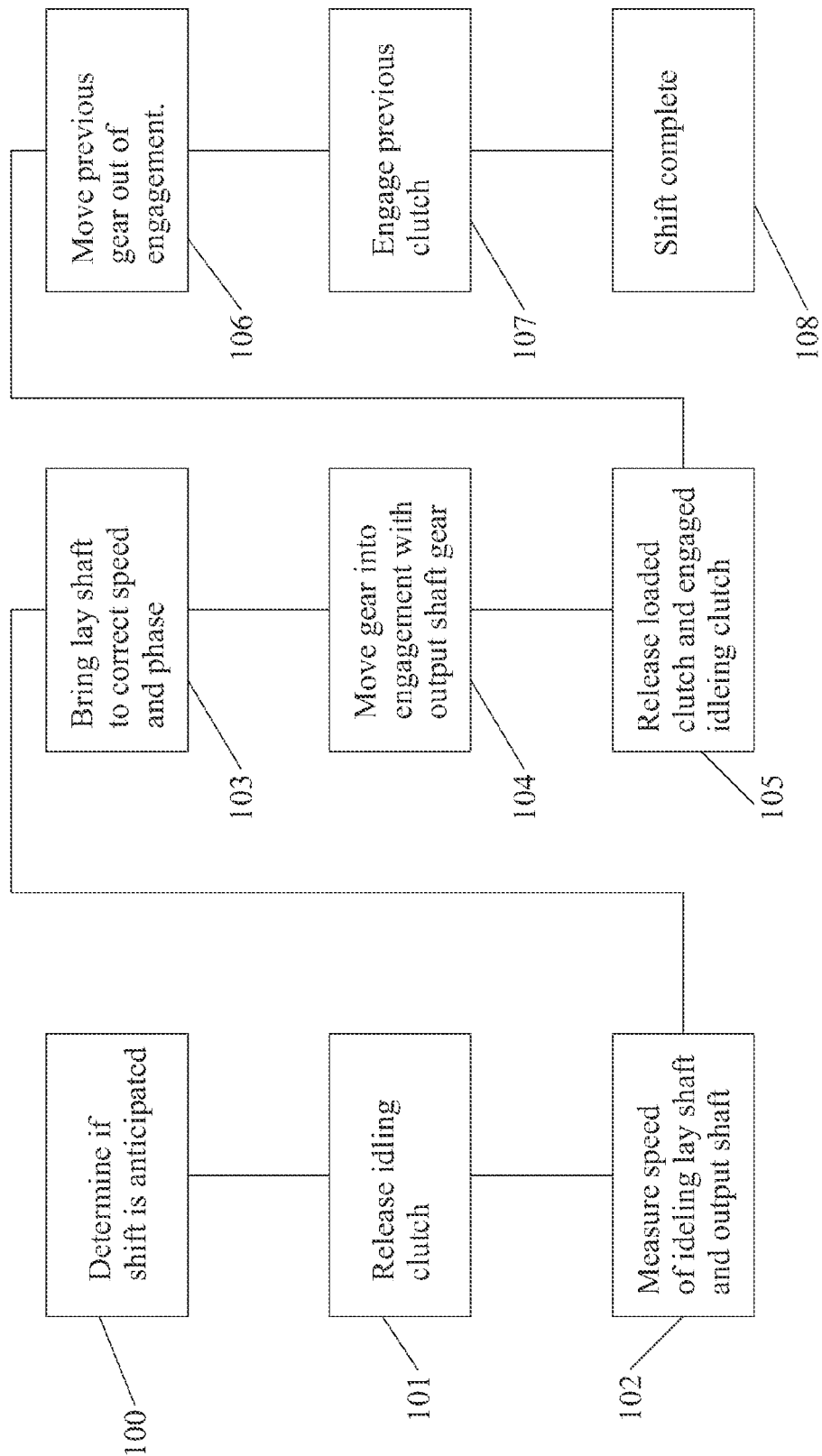

FIG. 2 This chart shows the steps taken to shift from one gear ration to another.

DETAILED DESCRIPTION

List of Drawing Elements

10 Input shaft.
11 First lay shaft.
12 Second lay shaft.
13 Output shaft.
20 Input drive gear.
21 First lay shaft drive gear.
22 Second lay shaft drive gear.
30 Input shaft bearing.
31 Output shaft bearing.
32 First lay shaft bearing.
33 First lay shaft bearing.
34 Second lay shaft bearing.
35 Second lay shaft bearing.
36 Output shaft bearing.
40 First lay shaft servo motor.
41 Second lay shaft servo motor.
42 First lay shaft speed and position sensor.
43 Output shaft speed and position sensor.
44 Second lay shaft speed and position sensor.
45 Transmission controller.
60 First and third shifter.
61 Second and forth shifter.
62 Fifth and seventh shifter.
63 Sixth and eighth shifter.
70 First gear, movable.
71 Second gear, movable.
72 Third gear, movable.
73 Forth gear, movable.
74 Fifth gear, movable.
75 Sixth gear, movable.
76 Seventh gear, movable.
77 Eighth gear, movable.
80 First and third gear, fixed.
81 Second and forth gear, fixed.
82 Fifth and seventh gear, fixed.
83 Sixth and eighth gear, fixed.
90 First lay shaft clutch.
91 Second lay shaft clutch.
100 Decision step.
101 Release idling clutch in anticipation of shift step.
102 Measure speed and gear phasing step.
103 Bring idling lay shaft to correct speed and phasing step.
104 Command actuator to bring movable gear into engagement step.
105 Release load carrying clutch and engage idling clutch step.
106 Command actuator to disengage previous load carrying gear step.
107 Engage clutch on now idling lay shaft step.
108 Gear shift complete step.

DETAILED DESCRIPTION

FIG. 1

FIG. 1 shows the layout of all the major components of the transmission. The input shaft 10 will connect to an engine possibly through a torque converter. This optional torque converter is not shown for simplicity sake. The input shaft 10 is solidly attached to the input drive gear 20. The input shaft 10 rides in a bearing 30. Power is transmitted through the input drive gear 20 to the two lay shaft drive gears 21 and 22.

The lay shaft drive gears 21 and 22 are not rigidly attached to the lay shafts but are able to spin on the shaft. The lay shaft drive gears 21 and 22 may be coupled to the lay shafts by the two clutches 90 and 91. These clutches 90 and 91 are controlled by the transmission controller 45. There is no connection shown in FIG. 1 between the clutches 90 and 91 and the transmission controller 45 to avoid cluttering the drawing.

Each lay shaft 11 and 12 have a set of movable gears 70, 71, 72, 73, 74, 75, 76, and 77. These movable gears are able to slide on the lay shafts but not rotate due to the splined lay shafts. The position of the movable gears is controlled by 4 actuators 60, 61, 62, and 63. These actuators are connected to the transmission controller 45 but the connections are not shown for simplicity in the drawing.

The actuators can move each of the movable gears to one of three positions. The center position is shown in FIG. 1. For example, actuator 61 is able to move the gear pair 71 and 73 to the left in FIG. 1. This would result in gear 71 engaging with gear 80. When the clutch 91 is actuated power will pass from the input shaft through gear 20 to gear 22 into the second lay shaft 12. The lay shaft will pass power to gear 71 which is engaged with gear 80. Gear 80 is permanently attached to the output shaft 13. This power passes from gear 80 to the output shaft then to the final load. The connection from the output shaft 13 to the load is not shown for simplicity. This is the situation when the transmission is in first gear.

When in first gear the actuators 60, 62 and 63 hold their gear pairs 70, 72 and 74, 76, and 75, 77 in the center which is the not engaged position. Clutch 90 is engaged and the lay shaft 11 spins freely. Clutch 90 is left engaged when the lay shaft 11 is not in use so as to avoid dragging friction and wear.

When the transmission controller determines that it wants to shift into second gear it prepares lay shaft 11. First the lay shaft 11 must be brought to the correct speed. The clutch 90 is released which allows the shaft to spin freely. The controller 45 measures the speed of the output shaft 13 using the output shaft position sensor 43. The controller 45 also measures the speed of the lay shaft 11 using the lay shaft position sensor 42. The controller 45 compares the two speeds and its knowledge of the number and position of the teeth on the two gears 70 and 80 which are to be engaged. If the speed and position of the lay shaft 11 is not correct, the controller commands the lay shaft motor 40 to bring the lay shaft to the correct speed and phasing so that the gears 70 and 80 can be engaged without grinding.

When the controller 45 determines that the two gears 70 and 80 are in proper alignment a command is issued to the actuator 60 to move the gear pair 70, 72 to the left resulting in gear 70 engaging with gear 80. This completes the preparatory steps necessary before the transmission can be shifted to the next higher gear ratio.

The actual change from first gear to second gear is accomplished by disengaging clutch 91 at the same time as clutch 90 is engaged. During this process power is removed from lay shaft 12 and applied to lay shaft 11. At the completion of the shift clutch 91 is disengaged.

The post shift process is to disengage gear 71 from gear 80. When the controller determines that the clutch 91 is fully disengaged it will issue a command to the actuator 61 to move the gear pair 71, 73 to the center position. This allows the lay shaft 12 to spin freely. To avoid drag in the clutch 91 the controller will command the clutch 91 to engage. This has completed the shift from first gear to second gear.

The next shift up to third gear proceeds similarly and results in gear 73 being engaged with gear 81. In each step the controller manages the preparatory process where the next set of gears are moved into position. The controller first synchronizes the freely spinning lay shaft using the position sensors and the motors to obtain correct speed and phasing of the gear teeth.

The actual shift is accomplished by releasing one clutch at the same time as engaging the second clutch. After the shift is complete then the controller disengages the now unused gear and engages the idling lay shaft's clutch. The process of shifting up to the next gear or down shifting are essentially the same.

Since one or both lay shafts are turning at all times that the engine is running the servo motors can do double duty and act as generators when they are not needed for shifting.

The speed and position sensors 42, 43, 44 are shown as magnetic resolver devices. This is only one possible choice. Another choice would be optical encoders. Alternatively magnetic pickups that sensed the teeth of the gears could be used. All of these are well known devices.

Alternatively the speed and position sensors 42, 44 can integral to the servo motors 40, 41. This is accomplished by measuring the back EMF of the motors windings. This indicates the relative position of the rotor to the stator. This technique is well known in the industry.

The servo motors 40, 41 are shown as separate units attached to their respective lay shafts 11, 12. Alternatively they can be integrated into other elements of the transmission. For example, they could act directly of the gears by using the gear as the rotor. Another example it that the servo motors could be integrated with the clutch.

Detailed Description

FIG. 2

FIG. 2 illustrates the step by step process of shifting the transmission from one gear ratio to the next. The first block 100 determines if a shift will occur in the near future. This is likely to be less than one second before the actual shift. If the decision is made to begin the anticipatory moves, but the conditions change, the shift process can be aborted. The decision to begin the anticipatory shifting process can be based on a number of factors;

1. Is the speed changing and the engine is nearing a RPM limit?
2. Is the speed constant and the engine needs to run at a more efficient RPM?
3. Has the engine's controller commanded a gear ratio change?
4. Has the driver commanded a gear change?

The information that the decision block 100 may need to perform its task can come from a number of sources. It may read the speed of the output shaft from the output shaft position sensor 43. It may get the engine speed and torque from the engine controller. The engine controller is not part of the present invention and is not shown. The decision block 100 may make the decision when to anticipate a gear shift or it may simply respond to commands from the engine controller or even from some other device controlled by the driver.

The next step 101 is to release the idling lay shaft clutch. During constant speed driving the transmission may not anticipate a shift. In this case the lay shaft not carrying power is spinning in an idle state. If, for example, we assume that we are shifting from first gear to second gear then the idling shaft is lay shaft 11. Its clutch 90 is engaged to reduce wear but it is not transferring power. Because the clutch 90 is engaged the lay shaft 11 is spinning, driven by the engine. It is not carrying power because its gears 70, 72, 74, 76 are not engaged. The first step in the shift process is to allow the idling lay shaft 11 to spin freely and not to be coupled to the engine.

After the idling lay shaft 11 is released to spin freely, the next step 102, is for the controller to measure the speed of the idling shaft 11 and the speed of output shaft 13. The controller will read this information from the two relevant speed and position sensors 42, 43. The controller will calculate any error in speed and position of the lay shaft 11 taking into account the number of and position of the teeth of two gears 70, 80 that will be engaged.

At block 103 the controller will use the speed and position error to drive the servo motor 40 to bring the lay shaft 11 to the proper speed and position so that the two gears 70, 80 are in alignment and can be engaged without grinding. This will be an iterative process where the speed and position will be monitored and servo motor 40 driven to reduce the errors.

In this step 104, when the error is reduced sufficiently the first and third shifter 60 will be commanded to move gear 70 into engagement with gear 80. The shifter has three positions; left, center, and right. The center position has the gear pair 70, 72 is the disengaged position. Moving left or right engages one gear of the gear pair.

Now the load is ready to me moved from the currently loaded lay shaft 12 to the new lay shaft 11, step 105. Now the state of the two clutches 90, 91 will be reversed. The currently loaded clutch 91 will be release while the other clutch 90 will be engaged. This transfer must be carefully orchestrated. The torque to the output shaft 13 should be smoothly changed from the previous value to the new value. The engine speed should likewise be smoothly changed as well. When clutch 91 is fully disengaged the power transfer is complete.

The next step 106 is to complete the post shift process. This entails disengaging the previous running gear set 71, 80 so that the lay shaft 12 can idle. The controller will issue a command to shifter 61 to move gear pair 71, 73 to the center position. The lay shaft 12 can now spin freely.

The final step 107 is to engage the clutch 91. This causes the lay shaft 12 to be locked to the engine through gears 20, 22. This results in the lowest wear for the transmission. The clutch is not moving with respect to the shaft so the clutch plates will not wear. No power is transmitted because no gear is engaged. This is the normal running and most efficient condition.

Block 108 indicates that the shift from one gear ratio to the next gear ratio has been completed. The transmission is now running in the lowest wear state and in the lowest drag state. In this state the running efficiency will be the highest.

I claim:

1. A transmission device able to automatically shift gears comprising,
   a. an input shaft, and
   b. an output shaft, and
   c. one or more lay shafts, and
   d. multiple fixed gears attached to said input and output shafts, and
   e. multiple slidable gears on said lay shafts, and f. a controller, and g. multiple gear shifting mechanisms, and h. one or more clutch mechanisms, and i. one or more motor driven synchronizing mechanisms, whereby said controller is able to engage said slidable gears with said fixed gears in different combinations providing different gear ratios between said input shaft and said output shaft by using said one or more clutches, and said gear shifting mechanisms, and said one or more motor driven synchronizing mechanisms.

2. The device of claim 1 wherein there are no less than two said lay shafts and no less than two said clutch mechanisms and no less than two said motor driven synchronizing mechanisms.

3. The device of claim 1 wherein there are magnetic speed and position sensors.

4. The device of claim 1 wherein there are optical speed and position sensors.

5. The device of claim 1 wherein a speed and position sensor is part of said motor driven synchronizing mechanism.

6. The device of claim 1 wherein said controller selects two of said gears that are to be engaged and causes the speed and position of the said two gears to be brought to the proper speed and position for engagement using the one or more said motor synchronizing mechanisms and the one or more said clutch mechanisms and the said gear shifting mechanisms to engage the said selected gears.

7. The device of claim 1 being a method of automatically changing the gear ratios in a transmission comprising the steps of a. providing an input shaft, and b. providing an output shaft, and c. providing one or more lay shafts, and d. providing multiple gears fixed to said input and output shafts, and e. providing multiple slidable gears riding on said lay shaft or shafts, and f. providing a controller, and g. providing multiple gear shifting mechanisms able to control said slidable gears, and providing one or more clutch mechanisms, and h. providing one or more servo motor driven synchronizers, i. whereby said controller is able to select different gear ratios by moving said slidable gears into engagement with said fixed gears in different combinations providing different gear ratios between said input shaft and said output shaft by using said one or more clutches, and using said gear shifting mechanisms, and using said one or more motor driven synchronizing mechanisms.

8. The method of claim 7 wherein there are provided no less than two of said lay shafts.

9. The method of claim 7 wherein there are provided magnetic position sensors.

10. The method of claim 7 wherein there are provided optical position sensors.

11. The method of claim 7 wherein said fixed gears are on said input shaft and said output shaft.

12. The method of claim 7 wherein said controller selects two of said gears to be engaged then reads the speed and position of the said selected gears and causes said servo motor to bring the speed and position of one of said two selected gears to the proper speed and position for engagement with the other of said two selected gears.

13. The method of claim 7 wherein said controller follows the steps of, a. selecting two of said gears to be engaged, and b. bringing one of said selected gears to the proper speed and position with the said selected mating gear using said one or more motor driven synchronizers, and c. engaging the said selected gear with the said mating gear using said gear shifter or shifters, and d. disengaging the load carrying clutch, and e. engaging the clutch associated with the said selected gears resulting in the non-load carrying lay shaft then becoming the load carrying lay shaft, and f. returning the transmission to the most efficient operating state.

14. The device of claim 1 being a method coupling a mechanical energy source to a load with improved efficiency comprising, a. an input shaft, and b. an output shaft, and c. one or more lay shafts, and d. multiple gears mounted on said shafts, and e. multiple gear shifters which are able to control their associated gear or gears, and f. one or more clutches, and g. a controller, and h. one or more motor driven synchronizers, whereby said controller is able to engage a chosen pair of said gears using said one or more of the said gear shifters and said one or more clutches and said one or more motor driven synchronizers.

15. The method of claim 14 wherein there are 2 of said lay shafts.

16. The method of claim 14 wherein there are 3 or more of said lay shafts.

17. The method of claim 14 wherein said controller engages a chosen pair of said gears by using said motor driven synchronizers to bring the speed and position of the said chosen pair of gears to the proper speed and position where the one or more of said gear shifters are able to engage the said chosen pair of gears without grinding said gears.

* * * * *